US 6,569,786 B1

(12) United States Patent
Marsh

(10) Patent No.: US 6,569,786 B1
(45) Date of Patent: May 27, 2003

(54) LAYERED REFLECTING AND PHOTOLUMINOUS FIRE RESISTANT MATERIAL

(75) Inventor: Bryan David Marsh, South Windsor, CT (US)

(73) Assignee: Omniglow Corporation, West Springfield, MA (US)

( * ) Notice: Subject to any disclaimer, the term of this patent is extended or adjusted under 35 U.S.C. 154(b) by 282 days.

(21) Appl. No.: 09/691,527

(22) Filed: Oct. 18, 2000

Related U.S. Application Data

(62) Division of application No. 09/229,009, filed on Jan. 12, 1999, now Pat. No. 6,159,878.

(51) Int. Cl.⁷ .......................... B32B 27/12; B32B 27/04
(52) U.S. Cl. .................. 442/132; 442/117; 442/131; 442/134; 442/414; 442/417; 428/325; 428/327; 428/913; 428/920; 428/921; 40/582
(58) Field of Search ................................ 428/325, 327, 428/913, 920, 921; 442/117, 131, 132, 136, 414, 419; 40/582

(56) References Cited

U.S. PATENT DOCUMENTS

| 1,373,783 A | 4/1921 | Willis |
| 2,333,941 A | 11/1943 | France et al. |
| 3,684,348 A | 8/1972 | Rowland |
| 4,533,592 A | 8/1985 | Bingham |
| 5,300,783 A | 4/1994 | Spencer et al. |
| 5,415,811 A | 5/1995 | Zampa et al. |
| 5,648,145 A | 7/1997 | Martin |
| 5,888,618 A | * 3/1999 | Martin ..................... 359/529 |
| 6,159,878 A | * 12/2000 | Marsh ..................... 156/67 |

* cited by examiner

*Primary Examiner*—Terrel Morris
*Assistant Examiner*—Ula C. Ruddock
(74) *Attorney, Agent, or Firm*—McHale & Slavin, P.A.

(57) ABSTRACT

Flexible, fire resistant, layered reflecting and photoluminous material is provided which combines the advantages of a light reflective component and a luminescent component in a fire resistant structure which meets National Fire Protection Association standards for inclusion in firefighter's protective clothing. The material includes a first layer of microspherical glass bead or prismatic light reflective plastic material having an underlying surface formed with a plurality of minute prism-like formations projecting therefrom at regular spaced intervals and an overlying substantially smooth light transmissive surface; a second layer containing a homogeneous blend of a resin containing effective amounts of a fire retardant, photoluminescent and, optionally luminescent additives; and a third layer which is a fire retardant fabric. The layers are joined at a first region such that the prism-like formations are substantially disabled or destroyed. A second region is thereby defined at which the first, second and third layers are physically distinct. In the second region, the layered material simultaneously radiates phosphorescent and reflected light from the prism-like formations through the smooth light transmissive surface of the first layer. Only phosphorescent light radiates from the first region.

11 Claims, 1 Drawing Sheet

LAYERED REFLECTING AND PHOTOLUMINOUS FIRE RESISTANT MATERIAL

REFERENCE TO RELATED APPLICATIONS

This application is a divisional of Ser. No. 09/229,009, filed on Jan. 12, 1999, now U.S. Pat. No. 6,159,878, Dec. 12, 2000, the contents of which are herein incorporated by reference.

FIELD OF THE INVENTION

This invention relates to visibility enhancing reflective fire retardant materials, and particularly relates to improved fire retardant materials having both reflective and photoluminous visibility enhancing properties.

BACKGROUND OF THE INVENTION

It is known to employ various reflective materials for safety and decorative purposes. These materials are extremely useful after dark when visibility under low light conditions becomes difficult.

Reflective materials are particularly beneficial when used in conjunction with protective clothing such as firemen's coats. Unfortunately, many of the available retroreflective materials are formed from substances which will not withstand the high temperature environments to which firemen or others may be subjected, thus relegating such materials to low temperature applications.

Firemen's clothing is illustrative of high temperature clothing. The materials and any trim attached thereto must meet strict standards established by the National Fire Protection Association (NFPA). With regard to heat resistance, materials must be able to withstand placement within a forced convection oven at a temperature of 500° F. (260° C.) for at least a five minute period. The materials must not melt, separate or ignite. With regard to flame resistance, the test material must withstand exposure to a direct flame, e.g. that emanating from a Bunsen burner, for a twelve second period. The test material must char less than four inches while not dripping or melting during exposure to the flame. Additionally, after the flame is removed, the test material must have an afterflame of less than two seconds. A material which passes the above tests regarding heat resistance and flame resistance is considered to define a fire-resistant structure. Although numerous materials are known which have superb reflective properties, it has been difficult to include such properties in a fire-resistant structure.

In order to create a reflective surface, the simple application of a reflective coating upon a substrate is perhaps the most common principle employed. Alternatively, the substrate might be formed from a highly reflective material, for example a polished metal. Another method of creating a reflective surface is the utilization of structures containing various formations which reflect the light rays impinging thereon, either principally as a result of the steepness of the angle at which the light ray impinges the surface or due to the inclusion of reflective coatings applied to the surface of the formations.

Retroreflective materials, e.g. those materials possessing the ability to reflect light rays in a substantially parallel path back toward the source of the is light, are known in the art. One such material is sold under the trademark SCOTCHLITE by Minnesota Mining and Manufacturing Company and is comprised of minute glass spheres embedded in a matrix of synthetic resin. Also known in the art, is a class of retroreflective materials constructed of either glass or synthetic plastic resin containing cube corner formations molded into one surface thereof.

U.S. Pat. No. 3,648,348 discloses a synthetic plastic reflective material, marketed under the tradename REFLEXITE, containing a body portion having substantially smooth surfaces on opposite sides thereof and a large number of relatively minute cube corner formations which are closely spaced. Each cube corner formation contained three faces and a base adjacent the body portion with a side edge dimension said to be not more than 0.025 inches and preferably less than 0.010 inches. The body portion and the cube member portion are separately formed from essentially transparent synthetic resin and bonded into a composite structure. To optimize reflectivity, the composite material includes a reflective coating which is deposited upon the cube corner formations. This coating is often in the form of a metallic material which is further protected with a backing material to insure that the metallic coating is protected.

In addition to the use of reflective materials, it is often desirable to utilize luminous materials for the purpose of providing nighttime visibility in locations having little or no available light. A "luminous material" or "luminous composition" is intended to include any material or composition which has phosphorescent or fluorescent properties. Photoluminescent compositions have the ability to absorb energy from light which impinges upon it and then reemit the stored energy over a period of time in the form of light. Examples of luminous devices are shown in U.S. Pat. No. 1,373,783 which discloses a glass plate mounted in a metal holder and a layer of luminous powder compressed between the glass plate and the metal holder; U.S. Pat. No. 2,333,641 which discloses a luminous adhesive sheet or tape material; and U.S. Pat. No. 5,415,911 which discloses a photoluminescent and retroreflective sheet material.

U.S. Pat. No. 4,533,592 discloses a fire-resistant fabric having a reflective and retroreflective trim useful for firemen's clothing. The trim combines a fire-resistant base fabric upon which a fluorescent coating has been applied with a retroreflective material attached to cover a portion of the fluorescent coated area. The fluorescent coating is provided to achieve high day time visibility. The retroreflective sheeting is bonded to the fluorescent coating in a pattern such as a single center stripe or pairs of narrow stripes, with the proviso that at least 50% of the surface area remains as a glossy fluorescent exposed color coat for contrast and daytime visibility. The fluorescent coating disclosed therein is not photoluminescent and therefore does not enhance visibility in low light or no light conditions.

U.S. Pat. No. 5,648,145 discloses a fire resistant retroreflective structure which incorporates an array of rigid retroreflective elements having a first side and a second side. A transparent polymeric film is attached to the first side of the array of rigid retroreflective elements. A transparent fire resistant polymer outerlayer is in turn attached to the transparent polymeric film. A flame retardant layer is proximate to the second side of the array of rigid retroreflective elements. A fire resistant underlayer is further attached to the flame retardant layer. The transparent polymeric film can be bonded to the fireresistant underlayer through the array of rigid retroreflective elements and the flame-retardant layer. In a particular method of assembly, pressure is applied to the retroreflective structure while exposing said structure to a suitable energy source such as ultraviolet light, heat or an electron beam. The bonded portions form the lines of a grid pattern and are significantly non-retroreflective as compared to the remainder of the retroreflective structure. Since the underlayer has no luminous or photoluminous properties, the grid lines do nothing to enhance visibility under any light conditions.

U.S. Pat. No. 5,300,783 to Spencer et al, the contents of which are herein incorporated by reference, discloses a flexible layered reflecting and luminous material which combines the advantages of a light reflective component and a luminescent component. The material includes a first layer of prismatic light reflective plastic material having an underlying surface formed with a plurality of minute prism-like formations projecting therefrom at regular spaced intervals and an overlying substantially smooth light transmissive surface. The material further includes a second layer of plastic luminescent material attached to the underlying surface of the prism-like formations. The layers are joined at a first region by heat sealing, ultrasonic welding, sewing, or stapling into a unitary structure. A second region is thereby defined at which the first layer and the second layer are physically distinct. In the second region, the layered material radiates luminescent light from the second layer through the underlying surface of prism-like formations and through the smooth light transmissive surface and simultaneously radiates reflected light from the prism-like formations through the smooth light transmissive surface of the first layer only phosphorescent light radiates from the first region. While possessing both micro prismatic reflective properties and luminous properties, the disclosure of Spencer et al fails to teach a fire-resistant structure that complies with NFPA guidelines for use on firefighter's protective clothing, or a method of producing such a structure, which incorporates both retroreflective and photoluminescent properties.

Thus, what is lacking in the art is a material defining a NFPA approved fire-resistant structure and method for its construction that provides enhanced retroreflective properties and simultaneously provides areas having enhanced photoluminescent qualities, thereby increasing a firefighter's visibility and safety under all lighting conditions, including "no-light" conditions.

SUMMARY OF THE INVENTION

The present invention provides a fire resistant structure and method for its construction which includes a layered reflecting and photoluminous material that increases total visibility under all types of lighting conditions, including "no-light". The material includes a flexible visibility enhancing material which combines the advantages of a light reflective component and a photoluminescent component. In a further enhanced embodiment of the invention, the material possesses photoluminescent, reflective and fluorescent properties within a fire resistant structure.

The material manifests fire resistant properties that meet or exceed the National Fire Protection Association guidelines for use in conjunction with firefighter's protective clothing. The material includes a base fabric formed from any suitable fire retardant material, exemplified by, but not limited to polyamides, glass fibers, fiberglass reinforced vinyls, fire retardant cotton and the like. A particularly preferred embodiment incorporates a fire retardant cotton such as Spring Mills' INHERENT FIREWARE or Westex's VALZON® FLAME RESISTANT FABRIC. A vinyl composite resin layer is formed which may be a distinct layer or may be applied to the base fabric. This layer typically includes a base PVC or the like equivalent resin containing effective amounts of any suitable fire retardant additive, e.g. a brominated additive, and further includes an effective amount of any suitable photoluminescent compound, such as zinc sulfide or strontium. The percentage of these ingredients may be adjusted so as to achieve the desired degree of photoluminescence and fire retardance. A further enhancement of the invention contemplates the inclusion of an effective amount of a fluorescence enhancing pigment to improve day time visibility.

In either case, a homogeneous mixture is formed by appropriate mixing techniques and a releasable layer may be cast by well-known methods for subsequent incorporation in the composite fire resistant structure. In an alternative construction, the fire retardant base fabric may be coated with the homogeneous mixture by such methods as hot or cold casting, extrusion, laminating or direct embossing. The resin layer or resin coated fire retardant fabric is then covered with a transparent synthetic material, typically a vinyl or polyester resin or equivalent thereof, which is smooth on one side and is formed with a prismatic pattern on the opposite side to redirect light back to its source. The prismatic side is positioned so as to be in contact with the fire retardant and photoluminous resin layer after which selected portions of the reflective material are bonded to both the photoluminous backing material and fire retardant base fabric, forming a unitary and complete fire resistant composite structure.

The step of bonding, which may be accomplished by a variety of techniques, such as heat sealing, ultrasonic welding, adhesive bonding and UV curable bonding techniques or the like, destroys or disables the prism-like formations and consequently the retroreflective properties in the bonded areas, resulting in a composite structure in those areas which is photoluminous, but not reflective. The areas between the bonds contain an area of entrapped air which enhances the reflective and retroreflective properties of the prismatic pattern contained therein.

The combined material forms a composite fire resistant structure containing a first retroreflective layer; a second layer containing at least photoluminous and fire retardant properties, and in certain embodiments also fluorescent properties; and a third layer containing a flame retardant fabric backing. The reflective material, when joined to the backing material, results in a composite fire resistant structure which is in compliance with NFPA guidelines for inclusion in protective clothing for firefighters.

In an additional embodiment of the invention, the retroreflective portion of the composite structure is composed of a layer of glass beads or microspheres. The glass microspheres are bonded to an appropriate fabric backing in a tightly packed arrangement which defines an exposed lens retroreflective surface. This retroreflective layer is in turn attached to a fire retardant and photoluminescent layer which is, in turn, bonded to a fire retardant fabric backing. In an enhanced embodiment, the photoluminescent layer also contains fluorescent properties.

It is an objective of this invention to provide a material for firefighter's protective clothing which is highly retroreflective, photoluminescent and fire resistant.

Another objective is to teach a retroreflective and photoluminescent material that meets or exceeds the National Fire Protection Association specifications.

Yet another objective of the instant invention is to provide a material for firefighter's protective clothing which is fire resistant and has highly retroreflective, photoluminescent and fluorescent properties.

It is a further objective of this invention to provide a method for fabricating a combined material possessing reflective, photoluminescent and fire resistant properties.

It is a still further objective of the instant invention to provide a reflective, photoluminescent and fire resistant material which contains a pressure sensitive adhesive layer to enable the material to be attached to a supporting structure.

Other objectives and advantages of this invention will become apparent from the following description taken in conjunction with the accompanying drawings wherein are set forth, by way of illustration and example, certain embodiments of this invention. The drawings constitute a part of this specification and include exemplary embodiments of the present invention and illustrate various objects and features thereof.

DETAILED DESCRIPTION OF THE INVENTION

Figure 1:
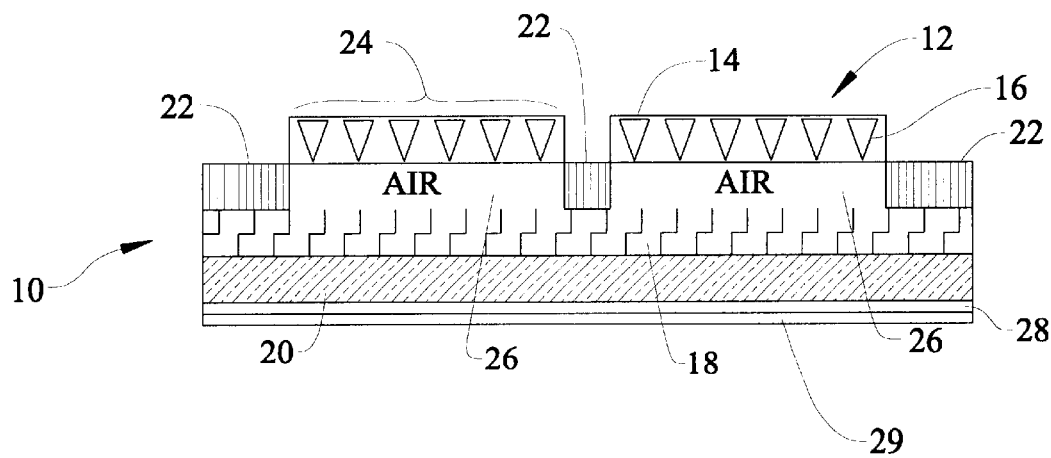
FIG. 1 is a cross-sectional view of a fire resistant structure containing both prismatic reflective and photoluminescent properties.

With reference to FIG. 1, a cross-sectional view 10 of the retroreflective and photoluminescent structure of the present invention is illustrated. The structure contains three physically distinct layers; an outermost layer 12, a fire retardant and photoluminescent resin layer 18 and a fire retardant backing fabric 20. The outermost layer 12 is a transparent synthetic resin having a smooth outer surface 14 and a prismatic pattern on a second innermost layer 16 which redirects incident light back towards its source. The retroreflective structure can be formed from a variety of polymers, selected from, but not limited to the group containing urethanes, polycarbonates, polyesters, polynitriles, polyolefins, acrylated silanes, acrylated urethanes and vinyls. In a preferred embodiment, the retroreflective array is formed from a vinyl or polyester resin. A second layer 18 is designed to be both fire retardant and photoluminescent. Layer 18 is formed from any suitable resin, such as a vinyl resin, containing a fire retardant additive, for example a brominated flame retardant or the like, in sufficient quantity to meet the NFPA guidelines for a fire resistant structure. In addition to the flame retardant, a photoluminescent powder is further incorporated within the resin mixture in sufficient quantities to provide photoluminescent properties to the finished structure, such that phosphorescent light radiates therefrom. The resin mixture is homogeneously blended and a layer is formed by suitable techniques, e.g. by casting and curing, which results in a flexible fire retardant and photoluminescent layer. Alternatively, the homogeneously blended mixture may be directly applied to the backing fabric 20 by suitable means such as hot or cold cast extruding, laminating or direct embossing thereby creating a unitary composite structure. In a further enhancement of the invention, a visibility enhancing effective amount of a fluorescent additive, e.g. a fluorescent pigment, is compounded within the resin layer to increase daytime visibility of the composite fire resistant structure. The resultant structure, containing retroreflective, photoluminescent and, in some cases, fluorescent properties, is formed by compressing and bonding selected areas of the layers together via any suitable technique, e.g. ultrasonic welding, heat sealing and the like along the borders thereof or in a particular grid pattern. The bonding process significantly reduces the retroreflective properties of layer 12 and results in an essentially non-retroreflective region 22 having photoluminescent properties and being capable of radiating only phosphorescent light. Adjacent these regions are retroreflective and photoluminous regions 24 which contain an air space 26 therebetween. It will be appreciated that while the bonding of the layers need only be accomplished along the peripheral edges, it is nevertheless possible to form the bonded region in a myriad of shapes thereby creating particular indicia or patterns useful for identifying or personalizing the underlying article. For example, the trim may be decoratively embossed during the bonding process creating an identifying pattern, such as the name of the fire company, thereby providing enhanced visual identification of the firefighters. In a further enhancement, a pressure sensitive adhesive is applied to the fire resistant retroreflective and photoluminescent material enabling application to a variety of underlying structures and equipment such as fire extinguishers, breathing apparatus, helmets and the like. The adhesive layer is attached to the fire retardant fabric backing opposite the resin layer.

Figure 2:
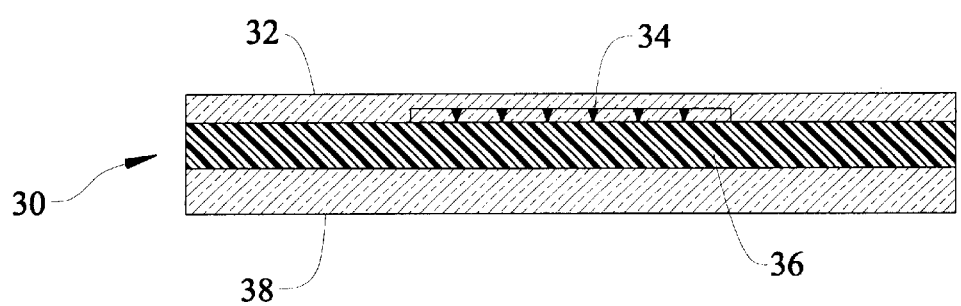
FIG. 2 is a cross-sectional view of a fire resistant structure containing both glass bead microsphere reflective and photoluminescent properties.

With reference to FIG. 2, a fire resistant structure 30 is shown which contains a thin film 32, a layer of microscopic glass beads or microspheres 34, a fire retardant resin layer 36, and a fire retardant fabric backing layer 38. The uppermost layer 32 is a UV inhibitor containing transparent polymer. This layer, which protects the underlying material from the effects of weathering, is optional. The reflective layer 34, which is of the exposed lens variety, is formed by bonding a plurality of microscopic glass beads in a tightly packed arrangement to a fabric backing. This combined material is then attached by any of several well-known laminating or bonding techniques to the fire retardant resin layer 36. Layer 36 is formed from a suitable resin, such as a vinyl resin, containing a fire retardant additive, for example a brominated flame retardant, in sufficient quantity to meet the NFPA guidelines for a fire resistant structure. In addition to the flame retardant, a photoluminescent powder and, in some instances a fluorescent pigment, is further incorporated within the resin mixture in sufficient quantities to provide the desired photoluminescent or photoluminescent and fluorescent properties to the finished structure. The resin mixture is homogeneously blended and a layer is formed by suitable techniques, e.g. by casting and curing, which results in a flexible fire retardant and photoluminescent layer which is, in turn, attached to the fire retardant fabric backing. Alternatively, the homogeneously blended mixture may be directly applied to the backing fabric by suitable means such as hot or cold cast extruding, laminating or direct embossing thereby creating a unitary composite structure. In a preferred embodiment, the backing is a fire retardant cotton fabric.

It is to be understood that while a certain form of the invention is illustrated, it is not to be limited to the specific form or arrangement of parts herein described and shown. It will be apparent to those skilled in the art that various changes may be made without departing from the scope of the invention and the invention is not to be considered limited to what is shown in the drawings and described in the specification.

I claim:

1. A fire resistant layered reflecting and photoluminous material comprising:
    a first layer of light reflective material composed of a layer of glass beads bonded to a fabric backing in a tightly packed arrangement so as to define an exposed lens retroreflective surface;

a second layer comprising a homogeneously blended mixture of a resin, an effective amount of a fire retardant additive and an effective amount of a photoluminescent material; and a third layer comprising a fire retardant fabric material;

wherein said first, second and third layers are joined together into a unitary composite structure defining at least one exposed lens retroreflective surface and at least one adjacent photoluminescent surface;

wherein said fire resistant material radiates reflected light from said exposed lens retroreflective surface and phosphorescent light from said adjacent photoluminescent surface.

2. The fire resistant layered reflecting and photoluminous material of claim 1, further comprising:

an additional uppermost transparent layer bonded to the surface of said fire resistant material and constructed and arranged so as to provide protection from the effects of weathering and ultraviolet radiation.

3. The fire resistant layered and reflecting photoluminous material of claim 1 wherein said second layer contains a visibility enhancing amount of a fluorescent additive.

4. The fire resistant layered reflecting and photoluminous material as set forth in claim 1 further including: a layer of pressure sensitive adhesive material adherent to a surface of said third layer opposite said second layer.

5. The fire resistant layered reflecting and photoluminous material as set forth in claim 4 further including: a sheet of backing material protectively adhered to said layer of pressure sensitive adhesive material and selectively removable therefrom to enable said fire resistant material to be attached to a supporting structure.

6. The fire resistant layered reflecting and photoluminous material as set forth in claim 1 wherein said third layer is composed of a cotton fabric containing an effective amount of a fire retardant additive.

7. A method of forming a fire resistant layered reflecting and photoluminous material comprising the steps of:

forming a first layer of light reflective material composed of a layer of glass beads bonded to a fabric backing in a tightly packed arrangement so as to define an exposed lens retroreflective surface;

forming a second layer comprising a homogeneously blended mixture of a resin, an effective amount of a fire retardant additive and an effective amount of a photoluminescent material;

forming a third layer comprising a fire retardant fabric material; and joining said first, second and third layers so as to form a unitary composite structure defining at least one exposed lens retroreflective surface and at least one adjacent photoluminescent surface;

wherein said fire resistant material radiates reflected light from said exposed lens retroreflective surface and phosphorescent light from said adjacent photoluminescent surface.

8. The method as set forth in claim 7 including the step of applying a layer of pressure sensitive adhesive material adherent to a surface of the third layer opposite the second layer.

9. The method as set forth in claim 7 including the step of applying a sheet of backing material so as to be protectively adhered to the layer of pressure sensitive adhesive material and selectively removable therefrom to enable the fire resistant material to be attached to a supporting structure.

10. The method as set forth in claim 7 wherein the second layer is composed of vinyl.

11. The method as set forth in claim 7, including the step of applying an additional uppermost transparent layer to the surface of said fire resistant material so as to provide protection from the effects of weathering and ultraviolet radiation.

* * * * *